(12) United States Patent
Martel et al.

(10) Patent No.: US 11,866,830 B2
(45) Date of Patent: Jan. 9, 2024

(54) ABRASIVE TIP COATING

(71) Applicant: Raytheon Technologies Corporation, Farmington, CT (US)

(72) Inventors: Nathan T. Martel, Glastonbury, CT (US); Fadi S. Maalouf, East Hampton, CT (US); William J. Joost, Worcester, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/197,365

(22) Filed: Mar. 10, 2021

(65) Prior Publication Data

US 2021/0285110 A1   Sep. 16, 2021

Related U.S. Application Data

(60) Provisional application No. 62/989,286, filed on Mar. 13, 2020.

(51) Int. Cl.
*C23C 28/00* (2006.01)
*F01D 5/28* (2006.01)
*B23B 35/00* (2006.01)

(52) U.S. Cl.
CPC ............ *C23C 28/347* (2013.01); *B23B 35/00* (2013.01); *C23C 28/341* (2013.01); *F01D 5/288* (2013.01); *F05D 2220/32* (2013.01); *F05D 2230/31* (2013.01); *F05D 2230/90* (2013.01); *F05D 2240/307* (2013.01); *F05D 2300/611* (2013.01)

(58) Field of Classification Search
None
See application file for complete search history.

(56) References Cited

U.S. PATENT DOCUMENTS 4,305,998 A * 12/1981 Manty ................. C23C 28/023
428/670
4,381,323 A * 4/1983 Lowe ..................... C04B 41/85
427/376.6
5,476,363 A    12/1995 Freling et al.
(Continued)

FOREIGN PATENT DOCUMENTS

EP   3346029 A1    7/2018
EP   3839095 A1    6/2021
RU   2585599 C1 *  5/2016

OTHER PUBLICATIONS

Mechanical Properties of Electroformed Nickel Cobalt Alloys; B. Stein, P. Jaeger and C. Przybyla; Proceedings of the 2nd International Surface Engineering Congress Sep. 15-17, 2003 Indianapolis, IN USA (Year: 2003).*

(Continued)

*Primary Examiner* — Humera N. Sheikh
*Assistant Examiner* — Elizabeth D Ivey
(74) *Attorney, Agent, or Firm* — Bachman & LaPointe, P.C.

(57) ABSTRACT

A blade has an airfoil having a tip. The blade has a metallic substrate and a coating system atop the substrate at the tip. The coating system has: a first layer of at least 99.0% weight nickel; an abrasive layer having a matrix and an abrasive at least partially embedded in the matrix; and a second layer between the first layer and the matrix. The second layer is tougher or more ductile than at least one of the first layer and the matrix.

25 Claims, 2 Drawing Sheets

(56) References Cited

U.S. PATENT DOCUMENTS

| | | | |
|---|---|---|---|
| 5,935,407 | A | 8/1999 | Nenov et al. |
| 8,266,801 | B2 | 9/2012 | Clark et al. |
| 8,425,751 | B1 | 4/2013 | Ogozalek et al. |
| 2017/0362944 | A1 | 12/2017 | Gibson et al. |
| 2018/0195192 | A1* | 7/2018 | Martel ............ C25D 7/00 |
| 2018/0216478 | A1* | 8/2018 | Martel ............ C25D 3/12 |
| 2018/0372111 | A1 | 12/2018 | Strock et al. |
| 2019/0063250 | A1 | 2/2019 | Shi et al. |
| 2021/0140050 | A1* | 5/2021 | Derderian ........ C23C 18/1662 |

OTHER PUBLICATIONS

Translation—RU-2585599-C1; Beklicheev P V; May 27, 2016 (Year: 2016).*

Naokazu Murata et al., "Fatigue Strength of Electroplated Copper Thin Films under Uni-Axial Stress", Journal of Solid Mechanics and Materials Engineering, Mar. 2009, pp. 498-506, vol. 3, No. 3, Japan Society of Mechanical Engineering, Tokyo, Japan.

C.H. Sample et al., "Physical and Mechanical Properties of Electroformed Nickel at Elevated and Subzero Temperatures", Jan. 1962, pp. 32-42, Symposium on Electroforming Applications, Uses, and Properties of Electroformed Metals. ASTM International, West Conshohocken, Pennsylvania.

Ahmad Raza Khan Rana et al., "Preparation and Tribological Characterization of Graphene Incorporated Electroless Ni—P Composite Coatings", Apr. 2019, pp. 334-346, Surface and Coatings Technology, Elsevier, Amsterdam, the Netherlands.

Shiyun Ruan et al., "Towards Electroformed Nanostructured Aluminum Alloys with High Strength and Ductility", Journal of Materials Research, Jun. 27, 2012, pp. 1638-1651, Materials Research Society, Warrendale, Pennsylvania.

Donald W. Baudrand, "Do's & Don'ts for Impurities in Nickel Plating Solutions", Oct. 2009, Plating & Surface Finishing, American Electroplaters' Society, Washington, D.C.

European Search Report dated Aug. 9, 2021 for European Patent Application No. 21162446.5.

* cited by examiner

ABRASIVE TIP COATING

CROSS-REFERENCE TO RELATED APPLICATION

Benefit is claimed of U.S. Patent Application No. 62/989,286, filed Mar. 13, 2020, and entitled "Abrasive Tip Coating", the disclosure of which is incorporated by reference herein in its entirety as if set forth at length.

BACKGROUND

The disclosure relates to turbine engine abrasive coatings. More particularly, the disclosure relates to metal matrix compressor blade tip coatings.

Gas turbine engines (used in propulsion and power applications and broadly inclusive of turbojets, turboprops, turbofans, turboshafts, industrial gas turbines, and the like) include abrasive tip coatings on the blades of their compressor and turbine sections. The abrasive tip coating may interface with an abradable coating on the inner diameter (ID) surface of a blade outer air seal.

An exemplary compressor blade has a titanium alloy or nickel-based superalloy substrate. The abrasive coating includes a base/bond layer formed as an electrolytic nickel strike (via Wood's nickel solution) atop the substrate. Exemplary thickness is 3.0 micrometers to 10.0 micrometers. After the strike, abrasive grit is tacked to the strike layer utilizing a sulfamate nickel plating chemistry. Exemplary abrasive grit material may include cubic boron nitride, silicon carbide, aluminum oxide, titanium boride, or other superabrasives. Exemplary grit size is between ASTM standard mesh 270 and 80. Exemplary tack layer matrix thickness is 25.0 micrometers to 50.0 micrometers.

After the tack, the remainder of the nickel matrix is applied to complete the coating utilizing a sulfamate nickel plating chemistry. Exemplary matrix thickness (including tack layer) is 50 micrometers to 150 micrometers. Exemplary abrasive grit are no more than 95% encapsulated.

The completed coating is baked in an air, argon, or vacuum atmosphere (e.g., at 375° F. to 1000° F. (190° C. to 538° C.)) to stress relieve the plated deposited and to abate hydrogen embrittlement.

In examining production blades, we have observed property alterations associated with cobalt (e.g., in the vicinity of 14 to 35 weight percent) in the nickel strike base layers.

In engineering applications, Wood's nickel plating solutions are typically only used to deposit a "strike" layer on top of auto-passivizing substrates such as stainless steels or nickel superalloys. The low pH of the Wood's nickel solution, coupled with the vigorous off-gassing of the process, effectively removes the naturally occurring oxide scales on the substrate and allows for a thin layer of pure nickel to be deposited. This thin layer of nickel is well adhered to the substrate and forms a suitable base to which subsequent electrochemically deposited layers can strongly adhere. Because of its ability to strongly adhere to both passivizing substrates and subsequent coating layers, nickel strike plating layers are sometimes referred to as a bond coat. The deposit itself is typically characterized by being a very thin, pure nickel layer (e.g., 1.0 to 3.0 micrometers) directly on top of the substrate and typically has high internal tensile stresses. Additionally, Wood's nickel deposits may contain nano-pore stringers which align with the columnar-grain microstructure. An exemplary Wood's nickel plating bath has 240 g/L nickel chloride and 125 mL/L hydrochloric acid.

Sulfamate nickel plating is the primary process used in engineering applications due to its inherently low internal stress (typically 55 to 85 MPa), high deposition rates, and high cathode efficiency. The deposit is characterized by being a pure nickel deposit with fine grain, columnar structure. Sulfamate nickel may be plated over 250 micrometers in thickness. An exemplary sulfamate nickel plating bath has 300 to 450 g/L nickel sulfamate, 0 to 30 g/L nickel chloride, and 30 to 50 g/L boric acid.

Outside the field of plated blade tip coatings, Watts nickel is the most commonly used type of nickel electroplating, due to its application for decorative purposes and for occasional engineering purposes. The Watts nickel bath can be modified in several different ways depending on the desired properties (e.g., bright nickel plate), but is typically used without additives for engineering applications. The Watts nickel plating deposit is characterized by being a pure nickel deposit with fine grain, columnar structure and relatively high internal tensile stress (110 to 210 MPa). Watts nickel may be plated over 250 micrometers in thickness. An exemplary Watts nickel plating bath has 240 to 300 g/L, nickel sulfate, 30 to 90 g/L nickel chloride, and 30 to 45 g/L boric acid.

SUMMARY

One aspect of the disclosure involves a blade having an airfoil having a tip. The blade has a metallic substrate and a coating system atop the substrate at the tip. The coating system has: a first layer of at least 99.0% weight nickel; an abrasive layer having a matrix and an abrasive at least partially embedded in the matrix; and a second layer between the first layer and the matrix. The second layer is tougher or more ductile than at least one of the first layer and the matrix. In this or other embodiments or aspects below, there may be additional layers or may be interface diffusion zones.

In a further embodiment of any of the foregoing embodiments, additionally and/or alternatively, the second layer has higher fracture toughness than the at least one of the first layer and the matrix.

In a further embodiment of any of the foregoing embodiments, additionally and/or alternatively, the second layer is more ductile than the at least one of the first layer and the matrix.

In a further embodiment of any of the foregoing embodiments, additionally and/or alternatively, the second layer is tougher than the matrix.

In a further embodiment of any of the foregoing embodiments, additionally and/or alternatively, the second layer is tougher than the first layer.

In a further embodiment of any of the foregoing embodiments, additionally and/or alternatively, the first layer is 3.0 micrometers to 10.0 micrometers.

In a further embodiment of any of the foregoing embodiments, additionally and/or alternatively, the second layer is 2.0 micrometers to 25.0 micrometers.

In a further embodiment of any of the foregoing embodiments, additionally and/or alternatively, the second layer comprises, by weight, at least 80% nickel and 1.0% to 10.0% cobalt.

In a further embodiment of any of the foregoing embodiments, additionally and/or alternatively, the second layer comprises, by weight, at least 95% nickel and 1.0% to 2.0% cobalt.

In a further embodiment of any of the foregoing embodiments, additionally and/or alternatively, the second layer comprises, by weight, no more than 1.0% elements other than said nickel and cobalt.

In a further embodiment of any of the foregoing embodiments, additionally and/or alternatively, the second layer is selected from the group consisting of: a nickel plating; a nickel/phosphorous-graphene composite; copper or copper alloy; and an aluminum-manganese alloy.

In a further embodiment of any of the foregoing embodiments, additionally and/or alternatively, the abrasive is selected from the group consisting of: cubic boron nitride; silicon carbide; aluminum oxide; titanium boride; and combinations thereof. The matrix is at least 99.0% nickel by weight.

A further aspect of the disclosure involves, a method for manufacturing the blade. The method comprises: applying the first layer by Wood's nickel strike; applying the second layer by Watts nickel plating; applying the abrasive with a tack portion of the matrix; and applying a further portion of the matrix without further abrasive.

A further aspect of the disclosure involves, a method for manufacturing the blade. The method comprises: applying the first layer by Wood's nickel strike; applying the second layer by sulfamate nickel plating; applying the abrasive with a tack portion of the matrix; and applying a further portion of the matrix without further abrasive.

In a further embodiment of any of the foregoing embodiments, additionally and/or alternatively, the applying the abrasive with the tack portion of the matrix is by sulfamate nickel plating and the applying the further portion of the matrix without further abrasive is by sulfamate nickel plating.

In a further embodiment of any of the foregoing embodiments, additionally and/or alternatively, the second layer is tougher than the tack portion.

A further aspect of the disclosure involves, a blade having an airfoil having a tip. The blade has a metallic substrate and a coating system atop the substrate at the tip and having a nickel-based first layer, an abrasive layer having a matrix and an abrasive at least partially embedded in the matrix, and a second layer between the first layer and the matrix. The second layer has by weight at least 80% nickel and 1.0% to 10.0% cobalt.

In a further embodiment of any of the foregoing embodiments, additionally and/or alternatively, the first layer has, by weight, either less than 1.0 weight percent cobalt or at least 5.0 weight percent more cobalt than the second layer.

A further aspect of the disclosure involves a method for applying an abrasive system to a blade tip. The method comprises: applying a strike layer; applying an interlayer after the applying of the strike layer; and applying an abrasive layer having a matrix and an abrasive at least partially embedded in the matrix. The interlayer is tougher or more ductile than at least one of the strike layer and the abrasive layer matrix.

In a further embodiment of any of the foregoing embodiments, additionally and/or alternatively: the blade has a forged or cast metallic substrate; the strike layer is applied directly to the substrate; the interlayer is applied directly to the strike layer.

A further aspect of the disclosure involves, a method for applying an abrasive system to a blade tip. The method comprises: applying a strike layer; applying an interlayer after the applying of the strike layer; and applying an abrasive layer having a matrix and an abrasive at least partially embedded in the matrix. The applying of the strike layer is a Wood's nickel strike. The applying of the interlayer is selected from the group consisting of: a nickel plating via a different process than the applying of the strike layer; a nickel alloy plating comprising by weight nickel and 1.0% to 10.0% cobalt; electroless plating of nickel/phosphorous-graphene composite; electrodeposition of copper or copper alloy; and electrodeposition of an aluminum-manganese alloy.

In a further embodiment of any of the foregoing embodiments, additionally and/or alternatively, the applying of the interlayer is selected from the group consisting of: Watts nickel plating; a nickel alloy plating consisting of by weight nickel, 1.0% to 2.0% cobalt, and no more than 1.0% by weight elements other than said nickel and cobalt; electroless plating of nickel/phosphorous-graphene composite having 10 to 20 volume percent phosphorous and 10 to 30 volume percent graphene; electrodeposition of at least 99.0 weight percent pure copper; and electrodeposition of Al-7.8Mn alloy.

In a further embodiment of any of the foregoing embodiments, additionally and/or alternatively: the blade has a forged or cast metallic substrate; the strike layer is applied directly to the substrate; and the interlayer is applied directly to the strike layer.

A further aspect of the disclosure involves, a blade having an airfoil having a tip. The blade comprises a nickel alloy substrate and a coating system atop the substrate at the tip. The coating system has: a first layer of at least 99.0% weight nickel with less than 0.5% cobalt; a second layer comprising by weight nickel and 1.0% to 10.0% cobalt; and an abrasive layer, comprising a matrix and an abrasive at least partially embedded in the matrix.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Examination of cobalt contamination in the nickel strike on production blades has led to the conclusion that cobalt alloyant added to an intermediate layer may improve fatigue performance by reducing crack propagation from the abrasive layer into the blade substrate. As is discussed below, the interlayer may be tougher than the matrix, than the strike, or both.

Figure 2:
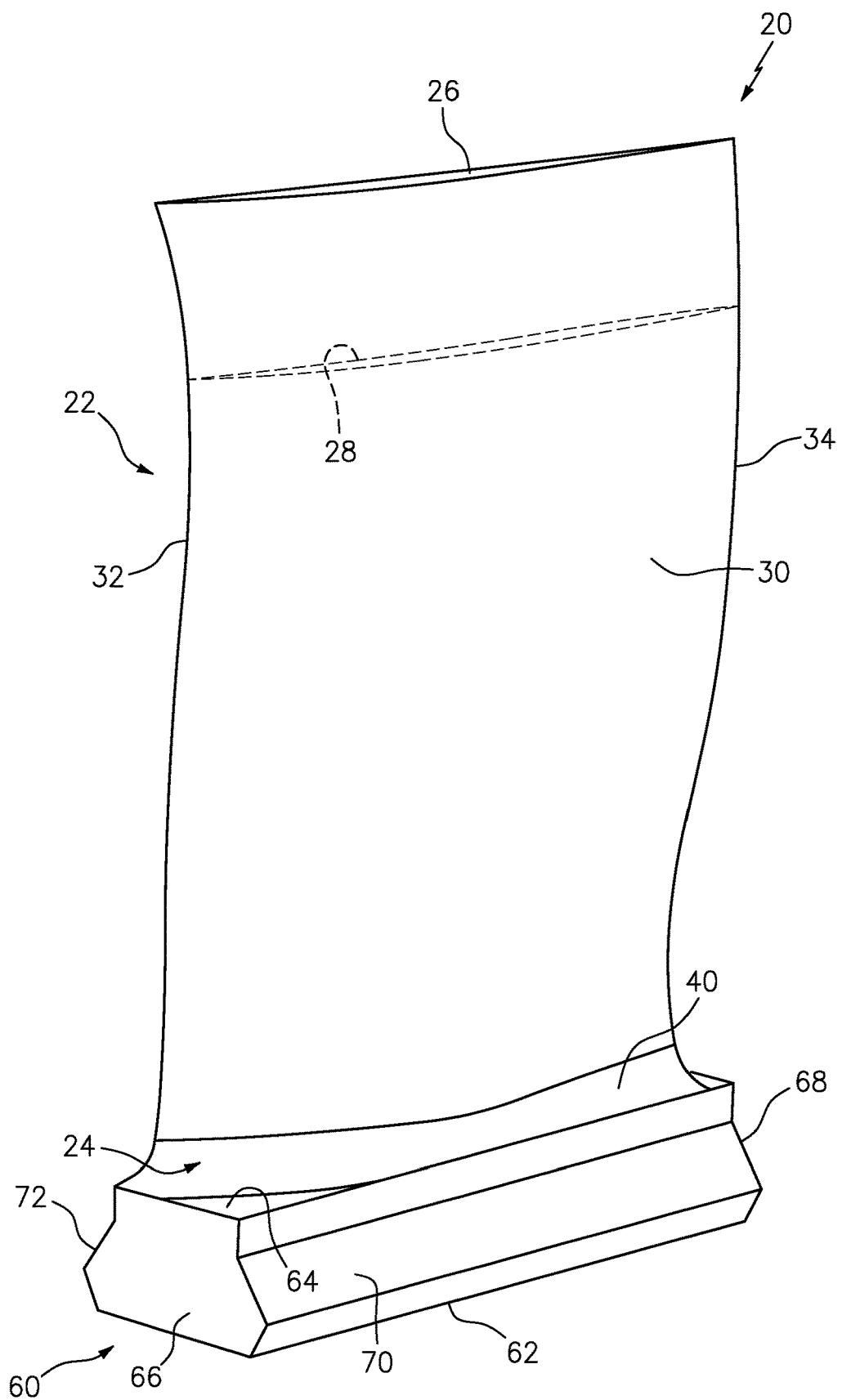
FIG. 2 is a view of the compressor blade.

FIG. 2 shows a blade 20. The blade may be used in a compressor or turbine section of a gas turbine engine (e.g., a compressor blade shown). The blade has an airfoil 22 extending from an inboard (inner diameter (ID)) end 24 to an outboard (outer diameter (OD)) end 26. In the exemplary blade, the outboard end forms a free tip which may include features such as a squealer pocket, cooling outlets, and the like. Alternative blades may include shrouded tips. The airfoil includes respective pressure 28 and suction 30 sides extending between a leading edge 32 and a trailing edge 34. Yet alternative blades may be on integrally bladed rotors (IBR).

The exemplary inboard end 24 merges at a fillet 40 with the outboard end of an attachment feature 60. The exemplary attachment feature is dovetail or firtree root having an inboard end 62, an outboard end 64 at the fillet 40, a forward end 66, an aft end 68, and lateral faces (sides) 70, 72. The lateral sides have the parallel convolution form providing the dovetail or firtree to be received in a complementary disk slot.

In alternative blades (not shown), at the inboard end 24 of the airfoil, the blade includes a platform having an inboard face (underside), an outboard face (gaspath face), a leading/forward end, a trailing/aft end, and lateral/circumferential ends. The attachment feature 60 depends from the underside of the platform.

An optional internal cooling passageway system (not shown) includes one or more outlets along the root inboard end with passageways extending to one or more inlets along the airfoil (typically including trailing edge outlets, leading edge outlets, surface outlets along the pressure and/or suction side, and tip outlets).

Figure 1:
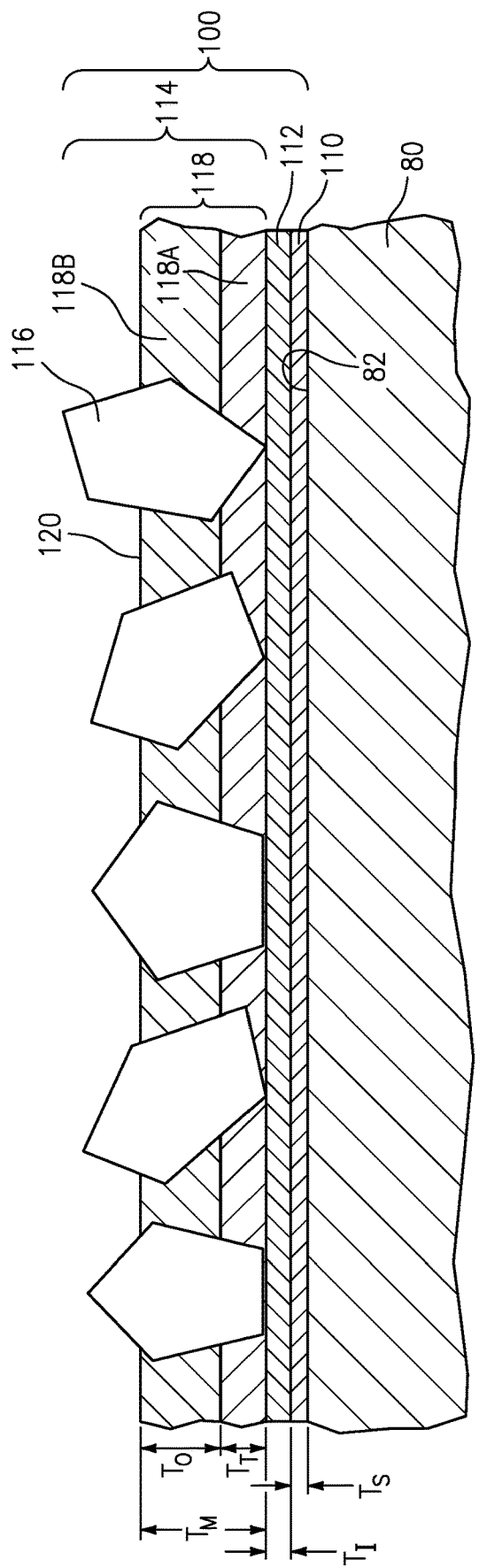
FIG. 1 is a sectional view of an abrasive coating on a compressor blade.

The exemplary blade is formed having a substrate 80 having a surface 82. In an exemplary embodiment, the substrate is a nickel-based superalloy (e.g., a cast single-crystal alloy for a separate blade or a powder metallurgical (PM) alloy or a cast and forged alloy for a separate blade or IBR). FIG. 1 shows an abrasive coating system 100 atop the surface at the tip. Additional coatings (not shown—e.g., thermal barrier coating systems and/or environmental barrier coating systems) may be atop the surface 82 elsewhere on the substrate. The abrasive coating system 100 is formed as a modification of a baseline (e.g., prior art discussed above) abrasive coating system by adding an interlayer discussed below. The coating system 100 comprises; a strike layer 110 (e.g., electrolytic Ni) atop the substrate; the added interlayer 112 atop the strike layer; and an abrasive coating 114 atop the interlayer. The abrasive coating comprises a particulate abrasive 116 embedded in a matrix 118 (e.g., electrolytic Ni). The matrix has an exposed outer surface 120. The coating system may be implemented as a modification of a baseline coating system otherwise similar, but lacking the interlayer 112. As such, the interlayer may add thickness between substrate and abrasive coating 114.

The interlayer 112 has greater fracture toughness (e.g., plane strain fracture toughness ($K_{Ic}$)) than one to all of the strike layer and matrix layer(s) discussed below. $K_{Ic}$ may be measured by ASTM E399-19 ("Standard Test Method for Linear-Elastic Plane-Strain Fracture Toughness $K_{Ic}$ of Metallic Materials", ASTM International, West Conshohocken, Pa.). The fracture toughness provides crack arresting capability for cracks starting at the abrasive-matrix interface and propagating down into the substrate.

Additionally, the fracture toughness of the interlayer 112 prevents cracks originating underneath the coating (in the substrate, substrate-coating interface, or strike layer) from propagating into the coating, which could result in coating failure, spallation, or loss of abrasive grits. For example, the inclusion of the abrasive grits in the metal matrix results in high stress concentrations zones at the grit-matrix interface. Additionally, the typically sharp-cornered geometry of abrasive particles creates concentrated stress regions. The elevated stress may result in the initiation of a crack. The crack can propagate down through the coating and into the substrate material, causing failure of the entire blade. By being tougher than the matrix 118, the interlayer 112 prevents or delays the propagation of these cracks into the substrate material. By being tougher than the strike 110, the interlayer 112 prevents cracks originating in the strike layer, at the coating-substrate interface, or in the substrate itself from propagating into the coating, which could result in coating failure, spallation, or loss of abrasive grits.

Fracture toughness of thin films can be very difficult to measure. Thus most literature studies do not report toughness, or they use non-standard methods for measurement. Elongation to failure (e.g., ductility) is perhaps the best property to use for estimating fracture toughness in lieu of fracture toughness measurements. Ductility of electrodeposited or autocatalytically deposited metal coatings may be measured by using the ASTM B489 bend test method (ASTM B489-85(2018), "Standard Practice for Bend Test for Ductility of Electrodeposited and Autocatalytically Deposited Metal Coatings on Metals". ASTM International, West Conshohocken, Pa.).

A first group of examples of the interlayer 112 is nickel-cobalt alloys (e.g., 1.0% to 10.0% cobalt, by weight, more particularly 1.0% to 2.0%, or about 1.5%). Exemplary alloys are balance nickel plus impurities (e.g., other elements at levels of 0.10 weight percent or less total, more broadly 0.50 or 1.0 weight percent total or less and 0.10 or 0.20 weight percent individually or less). Aluminum, copper, lead, zinc, iron, and chromium are common impurities in plating. Potential intentional alloying elements are manganese, iron, copper, tin, zinc, boron, phosphorus and/or tungsten. These may be included in the aforementioned 0.50 or 1.0 weight percent total and 0.10 or 0.20 weight percent individually. Practical difficulties in consistency of intentional ternary plating, quaternary plating, or beyond tends to limit the likelihood of significant amounts of intentional alloyants, particularly beyond ternary systems.

If intentional alloyants are included, manganese in amounts up to 5.0 weight percent may be included to mitigate the embrittling effects of sulfur and to increase the strength of the deposit. Iron in amounts up to 35 weight percent may be included to reduce cost associated with nickel metal or to modify the ductility and hardness of the interlayer. Copper in amounts up to 20 weight percent may be added to modify the interlayer corrosion resistance, magnetic, and thermophysical properties of the interlayer. Tin in amounts up to 20 weight percent may be added to modify the interlayer corrosion resistance and inhibit the penetration of oxidation. Zinc in amounts up to 20 weight percent may be added to modify the interlayer corrosion resistance properties. Boron in amounts up to 10 weight percent may be added to modify the interlayer hardness and wear resistance. Phosphorous in amounts up to 20 weight percent may be added to modify the interlay corrosion resistance, hardness, and wear resistance. Tungsten in amounts up to 20 weight percent may be added to modify the interlayer hardness and wear resistance.

An exemplary process starts with a forged powder metallurgical (PM) or cast substrate (Ni-based superalloy or Ti-alloy (e.g., Ti6Al4V or other TiAl alloy) post-machining. Depending on implementation, a thermal barrier coating system and/or environmental barrier coating system may be on relevant areas of the substrate surface.

A preparation step may include the technician(s) preparing the substrate tip such as by solvent cleaning and/or roughening (e.g., using a grit blasting process utilizing alumina, garnet, or other media at pressures up to 800 KPa (e.g., 150 KPa to 800 KPa).

The preparing may include a post-roughening cleaning of the substrate tip (e.g., using an alkaline or solvent based solution such that light oils, greases and fingerprints are removed). In one example, the airfoil is cleaned in a light duty alkaline solution at no greater than 95° C. for less than 30 minutes (e.g., 50° C. to 95° C. for 5 minutes to 30 minutes).

The preparing may further include a subsequent etching (e.g., using electroless or electrolytic processes in an acid based solution). The acid solutions may consist of mixtures of hydrochloric acid and water; sulfuric acid, hydrofluoric acid, and water; or nitric acid, hydrofluoric acid, and water. The solutions may be used in conjunction with an anodic current (e.g., 2.0 to 8.5 A/dm$^2$ (Amperes per square decimeter)). Solution may be at room temperature or heated to up to 60° C. In one embodiment, the airfoil is etched in a muriatic acid solution at room temperature and an anodic current of 6 A/dm$^2$ for 0.50 to 3.0 minutes.

An exemplary step for depositing the electrolytic strike layer 110 is directly onto the substrate from a Wood's nickel solution. The strike layer may also be called the "bond layer" as its purpose is to form a strong bond to both the substrate material and the subsequent coating layers. In an exemplary embodiment the strike layer is deposited from the Wood's nickel solution at 21° C. to 32° C. (e.g., typical room// factory temperature) and at a cathodic current density up to 7 A/dm$^2$ (e.g., about 5.9 A/dm$^2$, more broadly 4.8 A/dm$^2$ to 7.0 A/dm$^2$) for 3.0 to 10.0 minutes. Exemplary deposition of the strike layer 110 is to a thickness Ts of 0.50 micrometer to 13.0 micrometers, more particularly, 1.0 micrometers to 5.0 micrometers or about 2.0 micrometers. The exemplary as-deposited strike layer consists essentially of pure nickel (no alloying elements). Impurity levels may be at levels of 0.10 weight percent or less total, more broadly 0.50 or 1.0 weight percent total or less and 0.10 or 0.20 weight percent each element individually or less. Aluminum, copper, lead, zinc, iron, and chromium are common impurities in plating. Also, intentional alloyants are possible. For example, high-Co Ni—Co systems are known (e.g., the 14 to 35 weight percent Co noted above).

An exemplary step for depositing the high fracture toughness interlayer 112 is on top of the strike layer (e.g., directly atop) such as via an electrolytic or autocatalytic chemical process. An exemplary process uses standard off-the-shelf nickel sulfamate plating solution with the addition of cobalt metal and/or cobalt sulfamate liquid such that the concentration of cobalt in the plating bath is 20 to 130 parts per million, more specifically, 25 to 60 parts per million, or about 35 parts per million. In the exemplary process, the nickel-cobalt plating solution is heated to 120° F. (49° C.), and a cathodic current density of 20 amps per square foot (2.15 amps per square decimeter) is applied for 5 to 60 minutes, or about 15 minutes. Exemplary deposition of the interlayer 112 is to a thickness $T_I$ of 1.0 micrometers to 125.0 micrometers, more particularly, 2.0 micrometers to 25.0 micrometers, or 3.0 to 10.0 micrometers, or about 5 microns. Exemplary interlayer 112 fracture toughness is at least 54.0 MPa/(m$^{1/2}$), more particularly, 54.0 MPa/(m$^{1/2}$) to 110.0 MPa/(m$^{1/2}$) or 60.0 MPa/(m$^{1/2}$) to 80.0 MPa/(m$^{1/2}$), or about 70 MPa/(m$^{1/2}$). This may be contrasted with exemplary fracture toughness 54 MPa/(m$^{1/2}$) for the matrix. Thus, exemplary differences may be or at least 5.0 MPa/(m$^{1/2}$) or 6.0 MPa/(m$^{1/2}$) to 60.0 MPa/(m$^{1/2}$). Strike layer toughness is expensive to quantitatively measure due to low thickness.

Ductility of the interlayer 112 may be 15.0% to 30%. Ductility of the matrix 118 may be 5.0% to 25.0%. It is possible that the interlayer is slightly less ductile than the matrix but higher strength so as to provide higher fracture toughness and resistance to fatigue cracking. As with toughness, ductility is also difficult to measure for the strike.

In an exemplary tack step, abrasive grits are "tacked" directly on top of the interlayer 112 utilizing a sulfamate nickel plating chemistry. The abrasive grit material may be cubic boron nitride, silicon carbide, aluminum oxide, titanium boride, or other superabrasive. Abrasive grit may be between ASTM standard mesh 270 and 80 in size. In the exemplary embodiment the abrasive grit are cubic boron nitride with an ASTM standard mesh size between 100 and 120. The matrix 118A of the tack layer has sufficient thickness such that abrasive grit are secured to the surface. Exemplary tack matrix 118A thickness $T_T$ is 25.0 micrometers to 50.0 micrometers, more broadly, 15.0 micrometers to 75.0 micrometers. Exemplary sulfamate nickel plating solution is heated to between 40° C. to 60° C. Exemplary cathodic current density is 1.0 A/dm$^2$ to 4.0 A/dm$^2$. Exemplary duration is for 45 minutes to 120 minutes. The exemplary layer consists of the matrix and abrasive. Exemplary as applied matrix 118A consists essentially of pure nickel (no alloying elements). Impurity levels may be at levels of 0.10 weight percent or less total, more broadly 0.50 or 1.0 weight percent total or less and 0.10 or 0.20 weight percent each element individually or less. Aluminum, copper, lead, zinc, iron, and chromium are common impurities in plating.

An exemplary step for applying a remainder 118B of the matrix (overlayer) is also via a sulfamate nickel plating chemistry. The chemistry and parameters may be generally similar to those used with the tack. Exemplary thickness $T_O$ is greater than that of the matrix layer 118A (e.g., 50.0 micrometers to 150.0 micrometers, more broadly, 40.0 micrometers to 200.0 micrometers or 150% to 300%). Exemplary sulfamate nickel plating solution is heated to between 40° C. to 60° C. Exemplary cathodic current density is less than the current density used for the matrix layer 118B because the presence of the abrasive particles reduces the conductive surface area of the airfoil tip. In this way, the effective current density is relatively constant due the smaller surface area. Exemplary cathodic current density is 0.5 A/dm$^2$ to 3.0 A/dm$^2$ based on the original airfoil tip surface area. Exemplary duration is for 60 minutes to 240 minutes. Exemplary as applied matrix 118B consists essentially of pure nickel (no alloying elements). Impurity levels may be at levels of 0.10 weight percent or less total, more broadly 0.50 or 1.0 weight percent total or less and 0.10 or 0.20 weight percent each element individually or less. Aluminum, copper, lead, zinc, iron, and chromium are common impurities in plating. The exemplary application of the matrix 118B leaves the abrasive grit no more than 95% encapsulated. Exemplary overall matrix thickness $T_M$ is 2.0 micrometers to 10 micrometers, more specifically, 3.0 micrometers to 6.0 micrometers, or about 4.0 micrometers. The matrix is more likely to have alloyants than is the strike layer. Exemplary matrix alloyants are manganese, iron, copper, tin, zinc, boron, phosphorus and/or tungsten. These may be included in the aforementioned impurity levels of 0.50 or 1.0 weight percent total and 0.10 or 0.20 weight percent individually. Practical difficulties in consistency of intentional ternary plating, quaternary plating, or beyond tends to limit the likelihood of significant amounts of intentional alloyants, particularly beyond ternary systems.

If intentional alloyants are included in the 118B layer of the matrix (overlayer), manganese in amounts up to 5.0 weight percent may be included to mitigate the embrittling effects of sulfur and to increase the strength of the deposit. Iron in amounts up to 35 weight percent may be included to reduce cost associated with nickel metal or to modify the ductility and hardness of the overlayer. Copper in amounts up to 20 weight percent may be added to modify the corrosion resistance, magnetic, and thermophysical properties of the overlayer. Tin in amounts up to 20 weight percent may be added to modify the overlayer corrosion resistance and inhibit the penetration of oxidation. Zinc in amounts up to 20 weight percent may be added to modify the overlayer corrosion resistance properties. Boron in amounts up to 10 weight percent may be added to modify the overlayer hardness and wear resistance. Phosphorous in amounts up to 20 weight percent may be added to modify the overlayer corrosion resistance, hardness, and wear resistance. Tungsten in amounts up to 45 weight percent may be added to modify the overlayer hardness and wear resistance. In some uses, electroplated wear coatings contain up to 40 wt % tungsten. However that much tungsten would embrittle the deposit, and hence is not a suitable level for application to the interlayer 112.

An optional stress relief step may involve heating. Exemplary heating is in air or under vacuum. Exemplary heating is at 375° F. to 1000° F. (190° C. to 538° C.) for 30 minutes to 180 minutes to stress relieve the plated deposited and to abate hydrogen embrittlement.

An alternative interlayer 112 composition is un-alloyed nickel deposited out of the Watts nickel plating solution which produces deposits with considerably high elongation to failure (analogous to fracture toughness) compared to the preceding (e.g., strike 110) and subsequent (e.g., matrix) layers. An exemplary standard off-the-shelf Watt's plating solution is used (e.g., 300 g/L nickel sulfate, 60 g/L nickel chloride). Exemplary nominal plating conditions: pH 3.0, temperature 140 F, current density 40 amp/sq-ft (4.3 amps per square decimeter). Thickness $T_I$ may be the same as initially noted above.

Potential advantages relative to the Ni—Co alternatives are the simplicity of operating the Watt's nickel plating solution, as there no need to balance the precise concentrations of dissolved nickel and cobalt metal in solution, as well as the lower cost of the Watt's nickel plating solution compared to nickel sulfamate and cobalt sulfamate solutions.

Further alternative interlayer 112 materials are electroless nickel/phosphorous-graphene composites. An exemplary composite is nickel-based with 15 volume % of phosphorus (more broadly 10 to 20 volume %) and 18 volume % of graphene nano-particles (more broadly 10 to 30 volume %). This may be applied by autocatalytic deposition methods from a nickel and phosphorus containing solution with 30 milligrams per liter of suspending graphene nano-particles. Potential advantages relative to the alternatives are the amorphous microstructure of electroless nickel-phosphorus-graphene composites which can provide enhanced corrosion protection to the substrate. Additionally, the electroless deposition method creates a deposit that has high uniformity, ensuring a consistent interlayer thickness regardless of the position of the airfoil in the plating tank. Thickness $T_I$ may be the same as initially noted above.

Further alternative interlayer 112 materials are electrodeposited aluminum-manganese alloys. An exemplary alloy is Al-7.8Mn (7.8 atomic percent Mn—see Shiyun Ruan and Christopher A. Schuh, "Towards electroformed nanostructured aluminum alloys with high strength and ductility", Journal of Materials Research, Jun. 24, 2012, pp. 1638-1651, vol. 27, no. 12, Cambridge University Press (Materials Research Society), Cambridge, United Kingdom). A broader compositional range is 4.0 to 14.0 atomic percent Mn, balance Al plus impurities. Exemplary application is by electrodeposition from a chloroaluminate ionic liquid solution containing 1-ethyl-3-methylimidazolium chloride and anhydrous manganese chloride. Potential advantages relative to the alternatives are the significantly lower density of the Al—Mn alloy compared to the nickel-based interlayer options. This is relevant for applications where weight savings are critical. Impurity levels may be at levels of 0.10 atomic percent or less total, more broadly 0.50 or 1.0 atomic percent total or less and 0.10 or 0.20 atomic percent each element individually or less.

Further alternative interlayer 112 materials are electrodeposited copper. For example, the interlayer 112 may be deposited from an acid or alkaline copper plating solution. The deposition may leave the layer 112 as essentially pure copper (e.g., at least 99.0% or at least 99.5% by weight). Thickness $T_I$ may be the same as initially noted above. Alternatively, the electrodeposited copper may be intentionally alloyed with up to 40.0 weight percent zinc or up to 45 weight percent tin (e.g., reflecting use of known bronze or brass plating techniques).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

The identification of particular layers does not preclude interface diffusion, particularly in-service. Accordingly, interface zones of a layer of a given composition may depart from the nominal composition specification or range while leaving the core within the nominal specification or range.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline coating system configuration and/or baseline process, details of such baseline may influence details of particular implementations. Accordingly, other embodiments are within the scope of the following claims.

What is claimed is:

1. A blade having an airfoil having a tip, the blade comprising:
   a nickel alloy substrate; and
   a coating system atop the substrate at the tip and comprising:
     a first layer comprising by weight at least 99.0% nickel;
     an abrasive layer, comprising:
       a matrix; and
       an abrasive at least partially embedded in the matrix; and
     a copper or copper alloy second layer between the first layer and the matrix and tougher or more ductile than at least one of the first layer and the matrix.

2. The blade of claim 1 wherein:
   the second layer has higher fracture toughness than the at least one of the first layer and the matrix.

3. The blade of claim 1 wherein:
   the second layer is more ductile than the at least one of the first layer and the matrix.

4. The blade of claim 1 wherein:
   the second layer is tougher than the matrix.

5. The blade of claim 1 wherein:
   the second layer is tougher than the first layer.

6. The blade of claim 1 wherein:
the first layer is 3.0 micrometers to 10.0 micrometers thick.

7. The blade of claim 1 wherein:
the second layer is 2.0 micrometers to 25.0 micrometers thick.

8. The blade of claim 1 wherein:
the abrasive is selected from the group consisting of:
cubic boron nitride;
silicon carbide;
aluminum oxide;
titanium boride; and
combinations thereof; and
the matrix comprises at least 99.0% nickel by weight.

9. A method for manufacturing the blade of claim 1, the method comprising:
applying the first layer by Wood's nickel strike;
applying the second layer by electrodeposition of at least 99.0 weight percent pure copper;
applying the abrasive with a tack portion of the matrix; and
applying a further portion of the matrix without further abrasive.

10. A blade having an airfoil having a tip, the blade comprising:
a metallic substrate; and
a coating system atop the substrate at the tip and comprising:
a nickel-based first layer;
an abrasive layer, comprising:
a matrix; and
an abrasive at least partially embedded in the matrix; and
a second layer between the first layer and the matrix and comprising by weight at least 80% nickel and 1.0% to 10.0% cobalt, the first layer having at least 5.0 weight percent more cobalt than the second layer.

11. The blade of claim 10 wherein:
the second layer comprises, by weight, at least 95% nickel and 1.0% to 2.0% cobalt.

12. The blade of claim 11 wherein:
the second layer comprises, by weight, no more than 1.0% elements other than said nickel and cobalt.

13. The blade of claim 10 wherein the first layer comprises:
14 to 35 weight percent Co.

14. The blade of claim 10 wherein:
the first layer is 0.5 micrometers to 13.0 micrometers thick; and
the second layer is 2.0 micrometers to 25.0 micrometers thick.

15. The blade of claim 10 wherein:
the metallic substrate is a nickel alloy substrate.

16. A method for manufacturing the blade of claim 10, the method comprising:
applying the first layer by Wood's nickel strike;
applying the second layer by sulfamate nickel plating;
applying the abrasive with a tack portion of the matrix; and
applying a further portion of the matrix without further abrasive.

17. The method of claim 16 wherein:
the applying the abrasive with the tack portion of the matrix is by sulfamate nickel plating; and
the applying the further portion of the matrix without further abrasive is by sulfamate nickel plating.

18. The method of claim 17 wherein:
the second layer is tougher than the tack portion.

19. A blade having an airfoil having a tip, the blade comprising:
a nickel alloy substrate; and
a coating system atop the substrate at the tip and comprising:
a first layer comprising by weight at least 99.0% nickel;
an abrasive layer, comprising:
a matrix; and
an abrasive at least partially embedded in the matrix; and
an aluminum-manganese alloy second layer between the first layer and the matrix and tougher or more ductile than at least one of the first layer and the matrix.

20. The blade of claim 19 wherein the second layer comprises:
4.0 to 14.0 atomic percent Mn.

21. The blade of claim 19 wherein the second layer is:
Al-7.8Mn alloy.

22. The blade of claim 19 wherein:
the first layer is 0.5 micrometers to 13.0 micrometers thick; and
the second layer is 2.0 micrometers to 25.0 micrometers thick.

23. A method for manufacturing the blade of claim 19, the method comprising:
applying the first layer by Wood's nickel strike;
applying the second layer by electrodeposition of said aluminum-manganese alloy;
applying the abrasive with a tack portion of the matrix; and
applying a further portion of the matrix without further abrasive.

24. The method of claim 23 wherein:
the applying the abrasive with the tack portion of the matrix is by sulfamate nickel plating; and
the applying the further portion of the matrix without further abrasive is by sulfamate nickel plating.

25. The method of claim 23 wherein the electrodeposition is:
electrodeposition of Al-7.8Mn alloy.

* * * * *